United States Patent [19]

Davis et al.

[11] Patent Number: 4,737,240
[45] Date of Patent: Apr. 12, 1988

[54] TRISAZO BLACK DYES FROM 2-(4'-AMINOPHENYLAZO)-7-AMINO-1-NAPHTHOL-3-SULFONIC ACID

[75] Inventors: Herbert S. Davis, Forked River; Roy E. Smith, Toms River, both of N.J.; Mortimer Weiser, Reading, Pa.

[73] Assignee: Ciba-Geigy Corporation, Ardsley, N.Y.

[21] Appl. No.: 879,710

[22] Filed: Jun. 27, 1986

Related U.S. Application Data

[63] Continuation-in-part of Ser. No. 729,710, May 2, 1985, abandoned.

[51] Int. Cl.$^4$ .................. C09B 31/16; C09B 31/26; C09B 33/22; D06P 1/06
[52] U.S. Cl. ......................... 162/162; 8/436; 8/527; 8/550; 8/581; 8/584; 8/585; 8/594; 8/611; 8/641; 514/150; 534/573; 534/582; 534/666; 534/680; 534/728; 534/815; 534/887; 534/583
[58] Field of Search ............. 8/527, 436, 550, 581, 8/584, 585, 594, 611, 641; 534/666, 680, 728, 815; 162/162; 514/150

[56] References Cited

U.S. PATENT DOCUMENTS

| | | | |
|---|---|---|---|
| 679,221 | 7/1901 | Ernst | 534/680 X |
| 1,740,801 | 12/1929 | Wolfsleben | 534/680 |
| 1,762,020 | 6/1930 | Kahn | 534/680 |
| 1,876,848 | 9/1932 | Brightman | 534/815 X |
| 1,877,800 | 9/1932 | Brightman | 534/666 |
| 1,906,754 | 5/1933 | Jordan | 534/666 X |
| 1,989,472 | 1/1935 | Clingestein et al. | 534/815 |
| 3,078,266 | 2/1963 | Hanhart | 534/815 X |
| 3,679,353 | 7/1972 | Streck | 534/728 X |
| 4,097,476 | 6/1978 | Wicki | 534/728 X |
| 4,443,571 | 4/1984 | Brulard et al. | 534/728 X |
| 4,479,906 | 10/1984 | Zeidler et al. | 534/680 |

FOREIGN PATENT DOCUMENTS 0021837  1/1981  European Pat. Off. ............ 534/666

OTHER PUBLICATIONS

The Chemistry of Synthetic Dyes, vol. VIII, (1978), p. 313, Vankataraman.

Colour Index, 3rd Edition, vol. 4, pp. 4293 to 4295 (1971).

*Primary Examiner*—Floyd D. Higel
*Attorney, Agent, or Firm*—Edward McC. Roberts; Kevin T. Mansfield

[57] ABSTRACT

Black trisazo dyes for cellulosic textiles, leather and especially paper having the structure

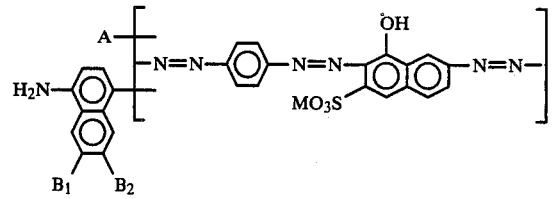

where A is

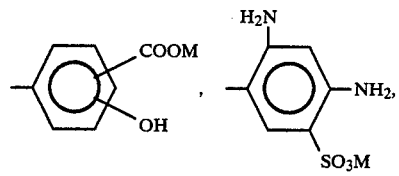

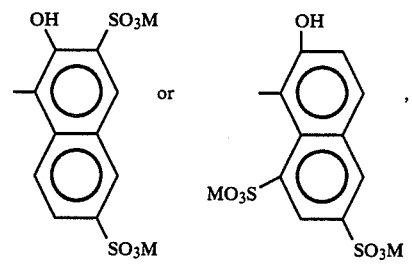

one of $B_1$ and $B_2$ is hydrogen and the other is $-SO_3M$ or a mixture thereof, and M is hydrogen, sodium, potassium, lithium or $-HNR_1R_2R_3$ wherein $R_1$, $R_2$ and $R_3$ represent the same or different substituents selected from hydrogen, lower alkyl and lower hydroxyalkyl, and stable liquid concentrates of these dyes are described.

15 Claims, No Drawings

TRISAZO BLACK DYES FROM 2-(4'-AMINOPHENYLAZO)-7-AMINO-1-NAPHTHOL-3-SULFONIC ACID

This is a continuation-in-part of application Ser. No. 729,710, filed May 2, 1985, now abandoned.

This invention relates to new trisazo dyes, mixtures thereof, and liquid colorant compositions based on them, to processes for the manufacture of these dyes and liquid colorant compositions and to their use in dyeing and printing materials, particularly paper.

The discovery that some of the intermediates heretofore employed in the manufacture of azo dyes were carcinogenic, such as benzidine, has spurred the search for new azo dyes not based on these hazardous intermediates. It is therefore an object of this invention to provide new azo dyes prepared without the use of highly toxic and/or carcinogenic intermediates.

It is a further object of this invention to provide new black dyes particularly suitable for dyeing paper treated with either acid or neutral sizing in deep true shades of pure black or reddish black, with high exhaustion of the dye to the paper and high degree of fastness.

One outstanding advantage of acidic azo dyes is that they may be solubilized with bases to prepare concentrated liquid dyeing compositions. Such liquid formulations eliminate the mess and bother associated with handling dry, often dusty powders. Liquid dye concentrates simplify and speed up the preparation of dyeing solutions since these liquid concentrates can be dispensed either by weight or volume and they disperse immediately. Thus, no time is wasted waiting for the solid dye particles to dissolve. This latter advantage is particularly important in paper beater dyeing operations where no heating is employed and water temperatures may approach freezing, especially in winter. It is therefore a further object of this invention to provide stable, highly concentrated black liquid dyestuff compositions which can be easily dissolved to prepare stock dye soutions.

A further advantage of the use of liquid concentrates is decreased dye manufacturing costs since the expensive drying, grinding and standardizing procedures can be eliminated. It is therefore a further object of this invention to provide economical, high strength black liquid colorants for paper.

These and other objects of this invention have been achieved with the synthesis of a novel group of trisazo dyes and with the preparation of liquid colorant compositions derived therefrom.

The new compounds are water soluble di-, tri- or tetrasulfonic acid compounds having the general formula:

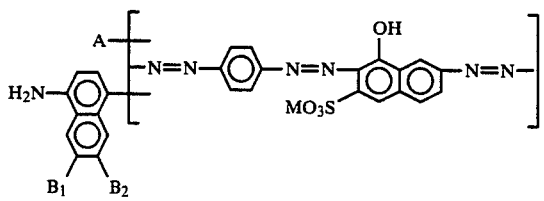

where A is

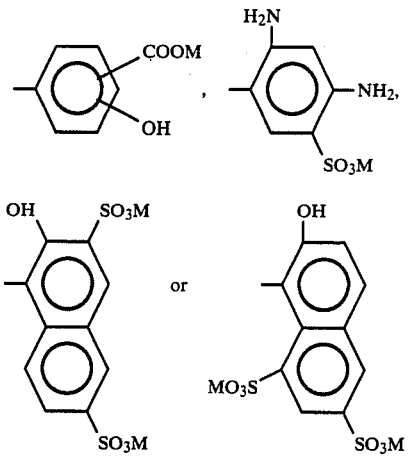

In the formula, one of $B_1$ and $B_2$ is hydrogen and the other is $-SO_3M$. Mixtures wherein $B_1$ and $B_2$ are interchanged may also be employed. M is hydrogen, sodium, potassium, lithium, or $-HNR_1R_2R_3$ wherein $R_1$, $R_2$ and $R_3$ are the same or different substituents selected from the group consisting of hydrogen, lower alkyl and lower hydroxyalkyl. By lower alkyl and lower hydroxyalkyl is meant groups having one to six carbon atoms.

The inventive dyes can be prepared by conventional diazotization and coupling reactions from known and readily available starting materials, but these starting materials have not heretofore been combined in the sequence necessary to form the dyes of the general formula. Thus, p-aminoacetanilide is diazotized and coupled to gamma acid (7-amino-1-naphthol-3-sulfonic acid) under mildly alkaline conditions. Deacylation of the resulting product with alkali liberates the corresponding diamine. This diamine is then tetrazotized and coupled first with one equivalent of 1,6- or 1,7-Cleve's acid or a mixture of the two under acidic conditions. It is then coupled with one equivalent of o-, m-, or p-hydroxybenzoic acid, m-phenylenediaminesulfonic acid (2,4-diaminobenzensulfonic acid), 2-naphthol-3,6-disulfonic acid (R acid) or 2-naphthol-6,8-disulfonic acid (G acid) under mildly alkaline conditions. Alternatively, the diamine intermediate can be subjected to two separate diazotizations and couplings, but this is unnecessarily cumbersome. Accordingly, the former method is preferred.

Following the above procedure, mixtures of trisazo dyes according to the general formula wherein the Cleve's acid and the A group can be interchanged are obtained. Said mixtures generally contain 20-50% of the second component. Both the individual dyes and the mixtures are operative in the invention.

This invention therefore also relates to the dye mixtures obtainable by the reaction sequence described above.

The resulting trisazo dyes can be isolated from solution either in the form of their sodium salts at the end of the final coupling or in the form of the free acid after acidification.

The trisazo dyes are normally prepared initially as the sodium salts for reasons of economy. However, they may also be prepared as the salts of other alkali metals if this is desired for example, to improve solubility. Alternatively, the sodium salt or the free acid form of the dye can be converted into a different salt by known methods. For example, the lithium, potassium, ammonium or alkylammonium salts can be prepared by suspending the dye, in free acid or ion exchange complex form, in water and neutralizing with lithium or potassium hydroxide, ammonium hydroxide, a quaternary ammonium hydroxide or an amine.

Amines which are suitable for use in this invention are preferably $C_1$–$C_4$ primary, secondary and tertiary alkyl, alkanol or mixed alkyl-alkanol amines. Such amines include methylamine, ethylamine, propylamine, isopropylamine, n-butylamine, diethylamine, dipropylamine, diisopropylamine, dibutylamine, diisobutylamine methylbutylamine, trimethylamine, triethylamine, diisopropylethylamine, tripropylamine, triisopropylamine, tributylamine, ethanolamine, diethanolamine, triethanolamine, methylethanolamine, dimethylethanolamine, methyldiethanolamine, ethyldiethanolamine, 1-diethylamino-2-propanol and 3-diethylamino-1-propanol. Suitable quaternary ammonium hydroxides include tetramethylammonium hydroxide, tetraethylammonium hydroxide and tetrabutylammonium hydroxide.

Suitable bases for use in the preparation of stable liquid color concentrates are those which substantially increase the solubility of the novel dyes relative to their sodium salts. Preferred bases are lithium hydroxide and secondary and tertiary $C_1$–$C_4$ alkanolamines, especially diethanolamine and triethanolamine. Particularly preferred on economic grounds is a commercial mixture containing about 85% of triethanolamine and 15% of diethanolamine. If desired, an excess of the base can be advantageously employed to increase the solubility of the dye.

A variety of other substances, all known in the dyestuff art, may be added to either the solid dye or the liquid color concentrates without departing from the spirit of this invention. For example, solid formulations may contain up to 25% of humectants to prevent drying out during storage, such as sorbitol, glycerine, ethylene glycol, polyethylene glycol, propylene glycol or polypropylene glycol. In liquid color concentrates, such materials, particularly ethylene glycol or propylene glycol and low molecular weight polyethylene glycols, can be used at levels of 5% to 20% as freezing point depressants.

Antifoaming agents such as silicones may be added to either the solid or liquid forms of the new dyes. Typically, they are effective at levels of 0.01% to 2% by weight.

Wetting agents may be added, at levels up to 5%, to control viscosity and to improve the application of the dyes to the substrate. Typically, wetting agents include dioctyl sodium sulfosuccinate, 2,4,7,9-tetramethyl-5-decyne-4,7-diol and ethylene oxide-ester condensates.

Chelating agents such as sodium hexametaphosphate, tetrasodium pyrophosphate or tetrasodium ethylenediaminetetracetate and hydrotropic agents such as urea, sodium xylene sulfonate or sodium naphthalene sulfonates can be used, typically at 0.5 to 5% levels, to improve solubility in hard water.

To prevent mold formation or decomposition by bacteria, antimicrobials and antifungals such as 6-acetoxy-2,4-dimethyl-m-dioxane or sodium pentachlorophenolate may be added in amounts of 0.01% to about 1%.

Commercial forms of the new dyes can be either solid or liquid. If solid, they can be in either the free acid form or, preferably, in the form of one or more of the previously described salts. Depending on the additives employed and the drying method, the physical form will vary from fine powders to granules. Spray drying, for example, provides coarse, non-dusting granules.

Because of the excellent solubility of the lithium and alkanolamine salts, stable liquid concentrates containing up to about 25% dye by weight are readily prepared. Such concentrates are stable, even at elevated temperatures and show excellent freeze-thaw stability. A particularly preferred liquid concentrate is one which contains about 12–22% by weight of a mixture of dyes of the formulae

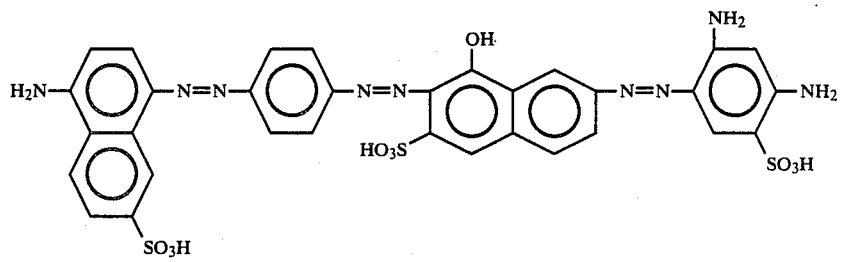

and

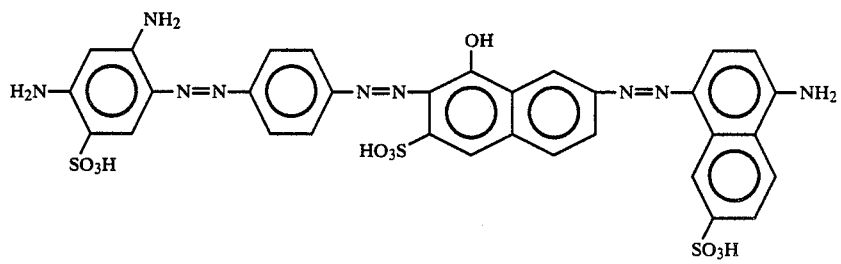

and about 14–25% of an alkanol amine, preferably triethanolamine. It advantageously further contains 10–15% of a low molecular weight polyethylene glycol and smaller amounts of other previously discussed additives.

Both the solid dyes and the stable liquid formulations of this invention can be used to dye cellulosic textiles and leather. However, they are especially useful for dyeing paper in various shades of black. As paper dyes, they show good all-around efficiency in both acid and neutral sizing and have high affinity and buildup. They can be used alone or in combination with other black dyes for shading purposes. The dye of the general formula wherein A is m-phenylenediaminesulfonate and $B_1$ is H, for example, produces deep black dyeings with a reddish shade. This property can be utilized to advantage to offset the blue or green shades of other black dyes.

The following examples will serve to illustrate the preparation and use of the dyes of this invention. Unless otherwise stated, parts and percentages are by weight and temperatures are in degrees Centigrade.

EXAMPLE 1

To a stirred slurry of 150 parts of p-aminocetanilide in 240 parts of ice and water at 0° C. is added 275 parts of 31.5% hydrochloric acid. While maintaining 3°–5° C. with additional ice as needed, 175 parts of a 40% solution of sodium nitrite is added to the stirred mixture. An excess of nitrite is maintained for at least 15 minutes as indicated by a deep blue color on starch-iodide test paper.

To a slurry of 221 parts of 7-amino-1-naphthol-3-sulfonic acid (gamma acid) in 450 parts of water is added 65 parts of a 50% sodium hydroxide solution to dissolve the acid and adjust the pH to 6.7–7.3. Then 90 parts of sodium carbonate and sufficient chopped ice to cool the mixture to 0° C. are added with good stirring. To this stirred mixture is added, over one hour, at pH 8.4–9.0 and 0°–5° C., the diazonium salt mixture prepared above after destroying the excess nitrite with sulfamic acid. Solid sodium carbonate is added as needed to maintain the pH. After completion of the coupling reaction, 7.5% by volume of solid sodium hydroxide is added and the mixture is stirred for 3–4 hours at 93°–95° C. to hydrolyze the acetamide group. The mixture is then cooled to 20° C. and 2900 parts of 31.5% hydrochloric acid are added. At about 0° C., the diamine is tetrazotized by adding 330 parts of a 40% sodium nitrite solution. After maintaining a positive starch-iodide test for one hour, the excess nitrite is destroyed with sulfamic acid and a solution of 172 parts of 1,6-Cleve's acid and 12 parts of 50% sodium hydroxide in 1000 parts of water at pH 6.9–7.4 is added to the stirred tetrazo mixture at 0°–2° C. After addition of about 80–85% of the Cleve's acid solution, sufficient sodium carbonate solution is added to raise the pH to 2.0–2.5 before completing the addition. This coupling mixture is then added to a stirred mixture of 175 parts of m-phenylenediaminesulfonic acid, 72 parts of 50% sodium hydroxide, 600 parts of water and 480 parts of powdered sodium carbonate at 5°–10° C. and pH 8.5–9.6 over 1–2 hours. The coupling mixture is stirred an additional 3–5 hours; then acidified at 83°–85° C. with 1400 parts of 31.5% hydrochloric acid to pH 0.5–0.8 to precipitate the black trisazo dye in free acid form. The crude dye is collected by filtration and washed with ice water to remove acid and salt. It is then sucked dry to yield a paste of 22 percent solids of the dye mixture of the formula.

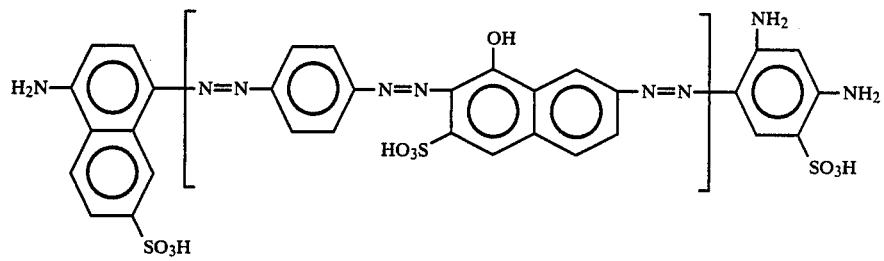

This dye mixture exhibits a maximum absorption at 570–580 nanometers.

EXAMPLE 2

At the end of the final coupling and hold period, the dye of Example 1 may be isolated in the form of its sodium salt by vacuum filtration at 5°–10° C. and pH 8.5–9.0. After washing the cake with 10,000 parts of an 8% by volume salt solution, sucking dry and drying the product at 95°–105° C., there is obtained 920 parts of dry material at 87% dye strength.

EXAMPLE 3

A liquid dye concentrate is prepared by solubilizing 100 parts of the filter cake of Example 1 containing 22 parts of dye in a mixture of 45 parts of water, 5 parts of propylene glycol and 23 parts of triethanolamine. The liquid concentrate, which had a dye concentration of 17%, showed no precipitation after 1 week at 40° C. While precipitation was observed on standing at −10° C., the precipitate redissolved at room temperature.

EXAMPLE 4

To 200 parts of water at room temperature is added 8 parts of 100% Bleached Softwood Kraft pulp. With vigorous stirring, 10 parts of clay filler and 10 parts of an aqueous 4% rosin size solution are added. After mixing for 5 minutes, 1.0 part of the concentrate of Example 3 is added and mixing is continued for 10 minutes. The pH is then adjusted to 4.5 with alum. After mixing a further 5 minutes, the pulp slurry is discharged to a sheet mold to form a hand sheet. The hand sheet is pressed between several pieces of blotting paper at 1200 psi and then run through a drum dryer at 350° F.

Neutral sized paper instead of acid sized is prepared by substituting 10 parts of calcium carbonate and 1.0 parts of a 4% solution of Hercon 48 for the clay and rosin size respectively in the above procedure.

With either procedure, the paper obtained is evenly dyed in a deep reddish black color.

EXAMPLES 5–11

The following table shows further dyes which can be produced according to Example 1 using the appropriate terminal coupling components. These dyes can be used for dyeing paper or leather in black shades.

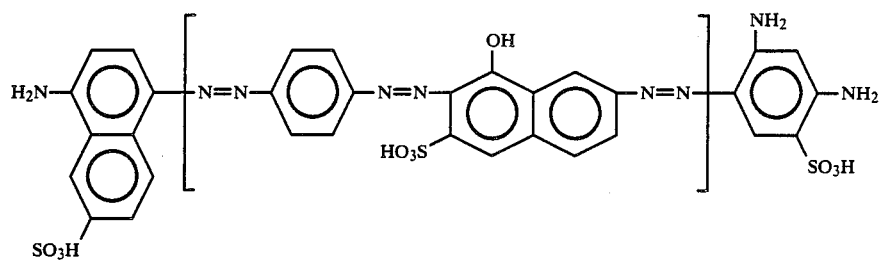
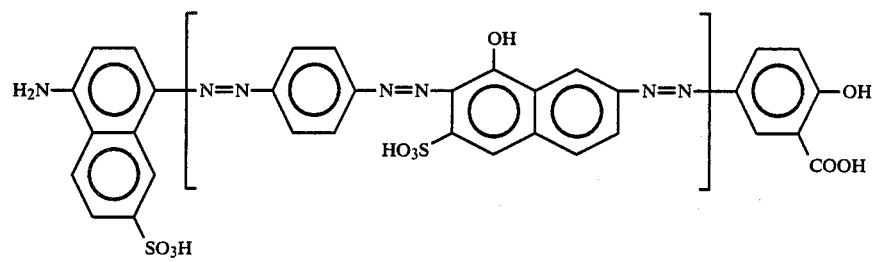
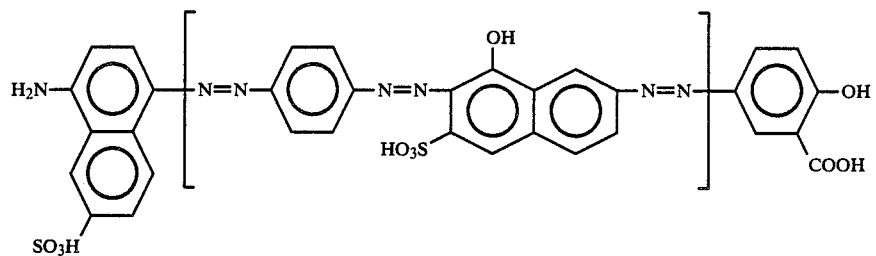
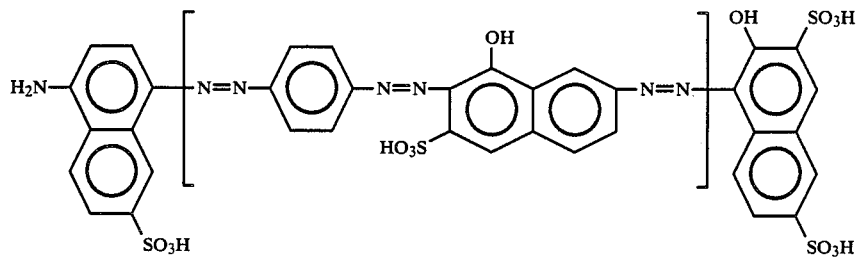
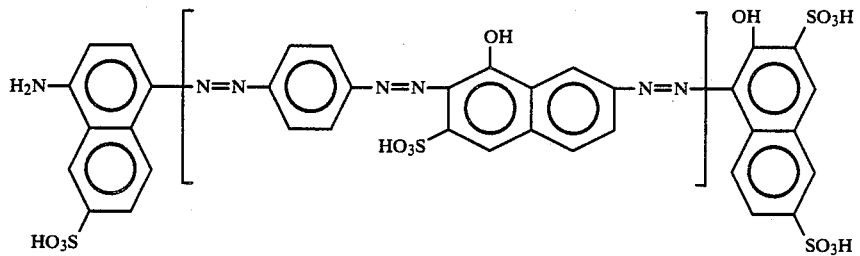
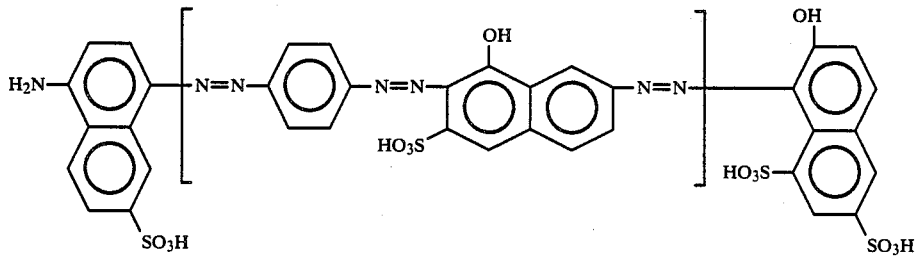

-continued

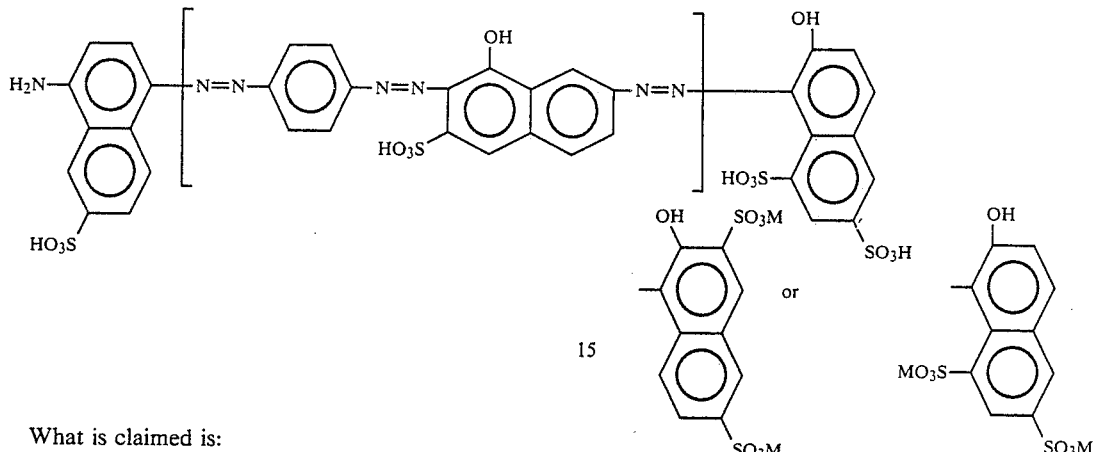

What is claimed is:

1. A compound of the formula

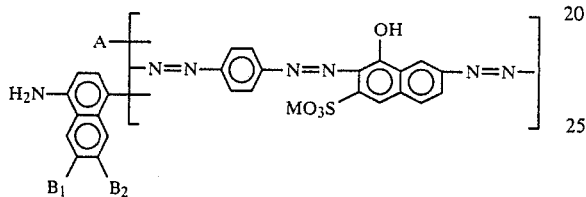

where A is

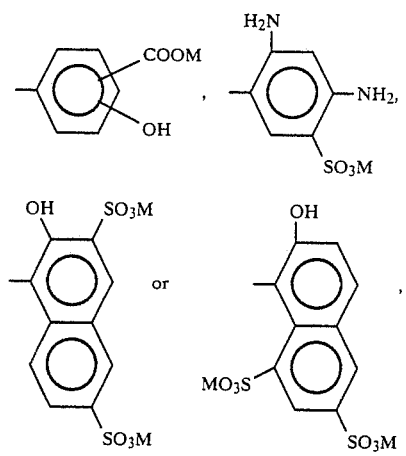

one of $B_1$ and $B_2$ is hydrogen and the other is $-SO_3M$ or a mixture thereof, and M is hydrogen, sodium, potassium, lithium or $HNR_1R_2R_3$ wherein $R_1$, $R_2$ and $R_3$ represent the same or different substituents selected from the group consisting of hydrogen, lower alkyl and lower hydroxylalkyl.

2. A compound of claim 1 wherein A is

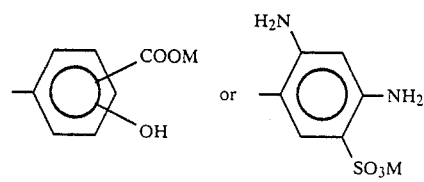

and M is hydrogen, sodium, lithium or $-HNR_1R_2R_3$.

3. A compound of claim 1 where A is and M is hydrogen, sodium, lithium or $-HNR_1R_2R_3$.

4. A compound of claim 1 wherein A is and M is hydrogen, sodium, lithium or $HNR_1R_2R_3$.

5. A compound of claim 4, wherein $B_1$ is hydrogen.
6. A compound of claim 4, wherein $B_2$ is hydrogen.
7. A liquid colorant composition which consists essentially of water, 12–25% of a dye of the formula of claim 1 wherein M is hydrogen, and from 10–30% of an amine of the formula $NR_1R_2R_3$ wherein $R_1$ is hydrogen or lower alkanol, $R_2$ and $R_3$ are each lower alkanol, and the amount of amine is at least sufficient to neutralize all the acidic groups of the dye.
8. A liquid colorant composition of claim 7 wherein the amine is triethanolamine or diethanolamine or a mixture thereof.
9. A liquid colorant composition of claim 8 containing 12–25% of the dye and 10–30% of the amine.
10. A liquid colorant composition of claim 7 which further contains an effective amount of at least one of a humectant, an antifoaming agent, a wetting agent, an anti-sedimentation agent, a chelating agent, an antimicrobial and an anti-fungal agent.
11. A liquid colorant composition which consists essentially of water, 10–25% of a dye of the formula of claim 1 wherein M is hydrogen and sufficient lithium hydroxide to both neutralize all of the acidic groups of the dye and to effect solution of said dye.
12. A process for the preparation of a liquid colorant composition which consists essentially of the step of mixing a dye of the formula of claim 1 wherein M is hydrogen with water and an amine of the formula $NR_1R_2R_3$ wherein $R_1$ is hydrogen or lower alkanol and $R_2$ and $R_3$ are lower alkanol at 15° to 75° C. until a homogenous composition is obtained.
13. A method of dyeing paper which comprises the step of applying to paper fibers or wood pulp, from an aqueous solution, a dye of the formula of claim 1.
14. A method of dyeing leather which comprises the step of applying to leather, from an aqueous solution, a dye of the formula of claim 1.
15. Paper which has been dyed with an aqueous solution of a dye of the formula of claim 1.

* * * * *